3,009,897
POLYMERIZABLE MIXTURE OF AN UNSATURATED POLYESTER AND AN ETHYLENICALLY UNSATURATED PHOSPHINE OXIDE, AND POLYMERIZED PRODUCT THEREOF
Ralph S. Ludington, Wilkinsburg, and William W. Young, Lawrenceville, Pa., assignors to Westinghouse Electric Corporation, East Pittsburgh, Pa., a corporation of Pennsylvania
No Drawing. Filed June 5, 1958, Ser. No. 739,994
10 Claims. (Cl. 260—45.4)

The present invention relates to polyester resins and has particular reference to polymerized polyester-organic phosphorus mixtures having excellent fire resistance, arc resistance and thermal stability.

An object of the present invention is to provide a polymerized composition comprised of a polyester resin and a co-reactive organic phosphorus monomer which possesses fire resistance, arc resistance and thermal stability, and is suitable for making laminated articles, cast articles, potted articles, and molded articles.

Another object of the present invention is to provide a polymerizable material comprised of a polyester resin and a co-reactive liquid organic phosphorus monomer suitable for making laminated articles, cast articles, potted articles and molded articles.

Other objects of the invention will, in part, be obvious and will, in part, appear hereinafter.

In accordance with the present invention and attainment of the foregoing objects, there is provided a polymerizable mixture comprising (1) 50% to 85% by weight of a polyester obtained by reacting (a) a polyhydric alcohol having no other reactive groups than the hydroxyl groups with (b) a substantially molar equivalent of at least one ethylenically unsaturated alpha, beta dicarboxylic acid and anhydrides thereof and (2) 50% to 15% by weight of a monomer having the structural formula

wherein R is selected from at least one of the groups consisting of

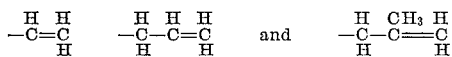

The ethylenically unsaturated alpha, beta dicarboxylic acid which may be employed in accordance with this invention include maleic acid, fumaric acid, maleic anhydride, monochloromaleic acid, itaconic anhydride, citraconic acid and citraconic anhydride. In preparing the polyester, up to 95% of the weight of the unsaturated acidic component can be replaced with one or more saturated dicarboxylic acids having from 2 to 10 carbon atoms per molecule, the carboxyl groups being located at the end of the chains and no other reactive groups being present thereon. Examples of such acids include succinic acid, adipic acid, sebacic acid, and the like. Phthalic anhydride can be employed in place of the above enumerated acids, if desired.

The polyhydric alcohols which are suitable for use in accordance with this invention include those aliphatic alcohols having no other reactive groups than the hydroxyl groups. Examples of suitable alcohols include ethylene glycol, glycerol, pentaerythritol, propylene glycol, diethylene glycol, 1,5-pentanediol and triethylene glycol. Mixtures of polyhydric alcohols also may be employed and in some cases epoxides can be used in place of glycols, particularly in reaction with dicarboxylic acids instead of their anhydrides. Castor oil also can be employed in reactions with maleic anhydride. The polyhydric alcohol should be employed with respect to the total amount of the acidic components in a molar equivalent, ±10%.

The polyester resins are prepared by reacting the acidic components and the polyhydric alcohol in accordance with usual esterification procedures. For example, the acidic components and the polyhydric alcohol are heated under reflux in the presence of an esterification catalyst such as hydrochloric acid, sulfuric acid, benzene sulfonic acid or the like. Removal of water formed in the reaction to increase the degree of esterification may advantageously be effected by utilizing azeotropic distillation as, for example, by carrying out the reaction in the presence of a volatile organic liquid, such as toluene, xylene or the like.

A reactive monomer suitable for use in accordance with the invention can be prepared by reacting an allyl, vinyl or methallyl magnesium halide, for example, allyl magnesium chloride, vinyl magnesium bromide, methallyl magnesium chloride, with a phosphorus compound having the general formula $PX_3$, where at least one of the X groups is a halide, preferably chlorine or bromine, and the other X groups are alkyl or aryl groups, for example, phosphorus trichloride and benzene phosphorus dichloride, with subsequent oxidation.

The polyester resin and allyl phosphine oxide are then combined in a proportion in the range of 50% to 85% by weight polyester and 50% to 15% by weight allyl phosphine oxide. The resultant mixture may be utilized to form cast articles, potted articles and laminated articles. The percentage of allyl phosphine oxide present is critical. If less than 15% by weight allyl phosphine oxide is present, the article will have only negligible fire resistance, if more than 50% by weight allyl phosphine oxide is used the article will be too brittle. Mixtures containing 25% to 35% by weight allyl phosphine oxide have been found most satisfactory.

At least one filler material, for example, mica, aluminum oxide trihydrate, glass fibers, and asbestos, may be added to the mixture in a range of 5% to 80% by weight.

At least one addition type polymerization catalyst may be added to the mixture in a range of 0.1% to 2% by weight. Examples of such catalysts include benzoyl peroxide, lauroyl peroxide, methyl ethyl ketone peroxides, t-butyl hydroperoxide, ascaridole, tert-butyl perbenzoate, di-t-butyl diperphthalate, ozonides and similar catalysts.

To illustrate even more fully the advantages and capabilities of the present invention, the following examples are set forth. The parts and percentages given are by weight unless otherwise indicated.

*Example I*

Approximately 65 parts of magnesium and 640 parts by volume of ethyl ether were charged into a reaction vessel equipped with a stirrer, an inlet for nitrogen gas, thermometer, refluxing condenser and a dropping funnel. The reaction vessel is sparged with nitrogen gas and cooled by an ice bath to a temperature maintained in the range of 5° C. to 10° C. while 184 parts of allyl chloride in 500 parts by volume of ethyl ether were slowly added through the dropping funnel over a period of approximately 8 hours. Then 66 parts of phosphorus trichloride in 150 parts by volume of ethyl ether was added over a period of one hour while the temperature was maintained in the range of 5° C. to 10° C. When the addition of the phosphorus trichloride is complete the mixture is refluxed for 9 hours.

After refluxing, the mixture is cooled to approximately 0° C. with the use of an ice bath, and saturated ammonium chloride is added until a granular precipitate is formed.

The ether layer is filtered off and stripped by sparging with air in a warm reaction vessel. When the volume is sufficiently reduced, it is filtered to remove any additional precipitated salt. The residual liquid is further purified by distilling at a temperature in the range of 98° C. to 100° C. in a 0.1 mm. Hg atmosphere. The distillate is triallyl phosphine oxide containing 16.18% phosphorus.

*Example II*

A mixture of 3910 parts of 2,2-bis-[parahydroxyethoxyphenyl] propane and 1090 parts of maleic anhydride were reacted while being sparged with carbon dioxide in a closed vessel at a temperature of 200° C. until the mixture had an acid number of 25. The mixture then was cooled and 0.008% hydroquinine based on the weight of the initial mixture of ingredients, was added at a temperature of 160° C. The polyester thus prepared is suitable for use in accordance with the teaching of this invention.

*Example III*

A mixture of 44 mole percent of adipic acid and 6 mole percent of fumaric acid was combined with 50 mole percent of propylene glycol and reacted with carbon dioxide sparging for a period of about 4 hours at a temperature of 140° C. in a closed reaction vessel. The temperature then was raised to 220° C. over a 4-hour period, and the reaction then continued at that temperature for an additional 8 hours. The polyester thus prepared is suitable for use in accordance with the teaching of this invention.

*Example IV*

A polyester resin suitable for use in accordance with this invention was prepared according to the procedure described in Example II by reacting 30 mole percent of maleic anhydride, and 50 mole percent of diethylene glycol.

*Example V*

A mixture of 1.5 parts of dimethyl terephthalate, 6 parts of ethylene glycol, 0.02% litharge, 0.05% antimony trioxide and 0.10% triphenyl phosphite, based on the weight of dimethyl terephthalate, were reacted for approximately four hours within a temperature range of 165° C. to 200° C. at atmospheric pressure. After esterification, the mixture was cooled to approximately 125° C. and 4.5 parts of fumaric acid was added. The mixture was heated slowly to 200° C. with nitrogen sparging. After maintaining the 200° C. temperature for one hour, 0.05% of hydroquinine, based on the total weight of reactants, is added and the reaction continued until the acid number falls below 50. The mixture is then cooled to room temperature. The polyester thus prepared is suitable for use in accordance with the teaching of this invention.

*Example VI*

A quantity of triallyl phosphine oxide prepared in accordance with Example I was combined with a quantity of each of the polyester resins prepared in accordance with Examples II to V and catalyzed with 1.5% by weight benzoyl peroxide. The mixture was cast into discs and cured by heating at approximately 100° C. for ½ hour. Each disc weighed 20 grams and was comprised of 70% polyester resin, 30% triallyl phosphine oxide.

The discs were heated in an over for 400 hours at 200° C., then cooled and weighed. The weight losses were found to be within the range of 2.0% to 5.0% by weight indicating the good thermal stability of the polyester-triallyl phosphine oxide mixture.

*Example VII*

A quantity of discs containing 25% by weight triallyl phosphine oxide, 75% of the various polyesters of Examples II to VI were prepared as in Example VI.

The discs were positioned between vertical electrodes and 500 volt-500 ampere "shots" of $\frac{5}{60}$ second duration were passed over the discs every 30 seconds. In a test such as this, surface conduction produced by carbon formation results in a restriking of an arc across the surface of the disc. Two successive restrikes are considered to constitute a failure.

The various polyester-triallyl phosphine oxide filled disc received from 15 to 25 "shots" before failure, indicating an arc resistance acceptable to the electrical industry.

*Example VIII*

The various polyester resins of Examples II to VI and triallyl phosphine oxide with a benzoyl peroxide catalyst, were molded into bars 5 inches x ½ inch x ½ inch and cured by heat at 90° C. for ½ hour. The bars were comprised of 80% by weight polyester, 20% by weight triallyl phosphine oxide.

One bar was placed in the center of an electric coil with its long axis in a vertical position and parallel to the long axis of the coil. Two spark electrodes were positioned on opposite sides of the bar perpendicular to the bar and about one inch down from the top of the bar.

Electric current was allowed to flow through the coil to heat the bar, and a voltage of 12,000 volts, with a resulting current of 20 milliamperes, was impressed upon the spark electrode.

The heating of the coil and sparking was continued until the bar was ignited. The sparking was then immediately stopped but heating of the coil was continued for another 30 seconds. The bar was allowed to burn until it went out by itself.

The time period from the time the heating of the coil and sparking began until the heating of the coil was discontinued is designated ignition time (I) and is measured in seconds, the time the test bar was actually burning is designated burning time (B) and is measured in seconds. The flammability index (F) is determined by the formula:

$$F = 10 \frac{I-B}{I+B}$$

The various samples tested had a flammability index in the range of 1.5 to 2.0, indicating very good fire resistance.

Satisfactory results can be achieved by substituting vinyl phosphine oxide for allyl phosphine oxide in Examples VI, VII and VIII.

The production of polyester resins which are flame retardant and have high resistance to heat is of considerable commercial importance. For instance, castings, moldings, laminated and potted structures from these resins are resistant to fire and will also endure high temperatures without deterioration. Typical illustration of applications in which the resinous members of this invention meet such requirements are had in castings for live electrical contacts, laminated tube barriers, bus bar supports, bus bar tubing, circuit breaker bushings, breaker pull rods, breaker barriers, and arc chute boxes which must not be ignited by sparks or be deteriorated by high temperature.

Since certain changes in the product embodying this invention may be made without departing from its scope, it is intended that the accompanying description be interpreted as illustrative and not limiting.

We claim as our invention:

1. A polymerized reaction product of (1) from 50% to

85% by weight of a polyester obtained by reacting (a) a polyhydric alcohol having no other reactive groups than the hydroxyl groups with (b) a substantially molar equivalent of an acidic component selected from the group consisting of ethylenically unsaturated alpha, beta, dicarboxylic acids, anhydrides thereof, and mixtures thereof, and (2) from 50% to 15% by weight of a monomer having the structural formula

wherein R is selected from the group consisting of

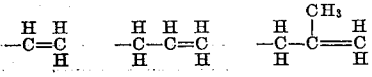

and mixtures thereof, said polymerized mixture having fire resistance, arc resistance and thermal stability.

2. A polymerized reaction product of (1) from 65% to 75% by weight of a polyester obtained by reacting (a) a polyhydric alcohol having no other reactive groups than the hydroxyl groups with (b) a substantially molar equivalent of an acidic component selected from the group consisting of ethylenically unsaturated alpha, beta, dicarboxylic acids, anhydrides thereof, and mixtures thereof, and (2) from 35% to 25% by weight of a monomer having the structural formula

wherein R is selected from the group consisting of

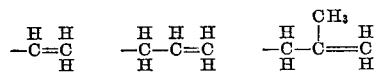

and mixtures thereof, said polymerized mixture having fire resistance, arc resistance and thermal stability.

3. A polymerized reaction product of (1) 70% by weight of a polyester obtained by reacting (a) a polyhydric alcohol having no other reactive groups than the hydroxyl groups with (b) a substantially molar equivalent of an acidic component selected from the group consisting of ethylenically unsaturated alpha, beta, dicarboxylic acids, anhydrides thereof, and mixtures thereof, and (2) 30% by weight of a monomer having the structural formula

wherein R is selected from the group consisting of

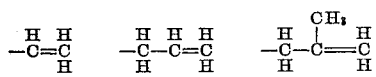

and mixtures thereof, said polymerized mixture having fire resistance, arc resistance and thermal stability.

4. A polymerized reaction product comprising (1) 70% by weight of a polyester obtained by reacting (a) a polyhydric alcohol having no other reactive groups than the hydroxyl groups with (b) a substantially molar equivalent of an acidic component selected from the group consisting of ethylenically unsaturated alpha, beta, dicarboxylic acids, anhydrides thereof, and mixtures thereof, and (2) 30% by weight of a monomer having the structural formula

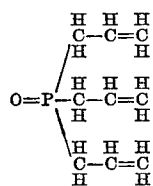

5. A polymerized reaction product comprising (1) 70% by weight of a polyester obtained by reacting (a) a polyhydric alcohol having no other reactive groups than the hydroxyl groups with (b) a substantially molar equivalent of an acidic component selected from the group consisting of ethylenically unsaturated alpha, beta, dicarboxylic acids, anhydrides thereof, and mixtures thereof, and (2) 30% by weight of a monomer having the structural formula

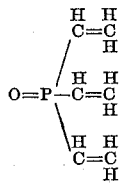

6. A polymerized reaction product comprising (1) from 50% to 85% by weight of a polyester obtained by reacting together 1 mole of terephthalic acid, 3 moles of fumaric acid and 4 moles of ethylene glycol and (2) from 50% to 15% by weight of a monomer having the structural formula

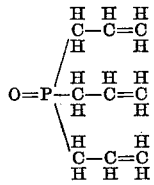

7. A polymerizable mixture comprising (1) from 50% to 85% by weight of a polyester obtained by reacting (a) a polyhydric alcohol having no other reactive groups than the hydroxyl groups with (b) a substantially molar equivalent of an acidic component selected from the group consisting of ethylenically unsaturated alpha, beta, dicarboxylic acids, anhydrides thereof, and mixtures thereof, and (2) from 50% to 15% by weight of a monomer having the structural formula

wherein R is selected from the group consisting of

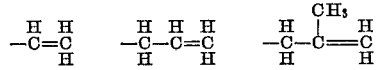

and mixtures thereof.

8. A polymerizable mixture comprising (1) from 65% to 75% by weight of a polyester obtained by reacting (a) a polyhydric alcohol having no other reactive groups than the hydroxyl groups with (b) a substantially molar equivalent of an acidic component selected from the group consisting of ethylenically unsaturated alpha, beta, dicarboxylic acids, anhydrides thereof, and mixtures thereof, and (2) from 35% to 25% by weight of a monomer having the structural formula

wherein R is selected from the group consisting of

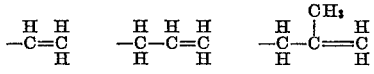

and mixtures thereof.

9. A polymerizable mixture comprising (1) 70% by weight of a polyester obtained by reacting (a) a polyhydric alcohol having no other reactive groups than the hydroxyl groups with (b) a substantially molar equivalent of an acidic component selected from the group consisting of ethylenically unsaturated alpha, beta, dicarboxylic acids, anhydrides thereof, and mixtures thereof, and (2) 30% by weight of a monomer having the structural formula

wherein R is selected from the group consisting of

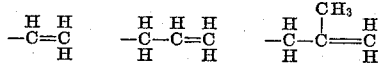

and mixtures thereof.

10. A polymerized reaction product comprising (1) 70% by weight of a polyester obtained by reacting (a) a polyhydric alcohol having no other reactive groups than the hydroxyl groups with (b) a substantially molar equivalent of an acidic component selected from the group consisting of ethylenically unsaturated alpha, beta, dicarboxylic acids, anhydrides thereof, and mixtures thereof, and (2) 30% by weight of a monomer having the structural formula

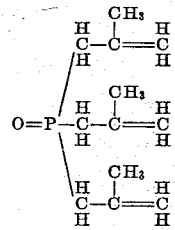

References Cited in the file of this patent

UNITED STATES PATENTS

| | | |
|---|---|---|
| 2,467,527 | Harris | Apr. 19, 1949 |
| 2,586,885 | Toy et al. | Feb. 26, 1952 |
| 2,714,100 | Toy et al. | July 26, 1955 |

OTHER REFERENCES

Kosolapoff: "Organophosphorous Compounds," published by John Wiley & Sons, Inc., New York (1950), page 113 relied on.